United States Patent
Wang et al.

(10) Patent No.: US 8,644,979 B2
(45) Date of Patent: Feb. 4, 2014

(54) HEATING ELEMENT LOCATION OPTIMIZATION

(75) Inventors: Youneng Wang, Greer, SC (US); Christopher S. Madden, Simpsonville, SC (US); Michael C. Andrews, Simpsonville, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 415 days.

(21) Appl. No.: 12/997,746

(22) PCT Filed: Jun. 30, 2008

(86) PCT No.: PCT/US2008/068729
§ 371 (c)(1),
(2), (4) Date: Dec. 13, 2010

(87) PCT Pub. No.: WO2010/002380
PCT Pub. Date: Jan. 7, 2010

(65) Prior Publication Data
US 2011/0098836 A1    Apr. 28, 2011

(51) Int. Cl.
*G06F 19/00*    (2011.01)

(52) U.S. Cl.
USPC ........................................... 700/204; 700/103

(58) Field of Classification Search
USPC .................................................. 700/103, 204
See application file for complete search history.

(56) References Cited

U.S. PATENT DOCUMENTS

| | | | |
|---|---|---|---|
| 3,274,825 A | 9/1966 | Wahlgren | |
| 3,429,005 A | 2/1969 | Macmillan et al. | |
| 3,649,729 A | 3/1972 | Davis et al. | |
| 4,371,483 A | 2/1983 | Mattson | |
| 5,055,245 A * | 10/1991 | Hisatomi et al. | 264/40.6 |
| 6,717,113 B2 | 4/2004 | Babikian | |
| 2007/0152362 A1 | 7/2007 | Greenwell et al. | |

FOREIGN PATENT DOCUMENTS

WO    2007/037778    4/2007

OTHER PUBLICATIONS

PCT International Search Report for PCT/US2008/068729, Sep. 3, 2008.
European Search Report for EP 08 77 2229, dated Jul. 16, 2013.
Qiao et al. "A Systematic Computer-Aided Approach to Cooling System Optimal Design in Plastic Injection Molding," International Journal of Mechanical Sciences, Oxford, Great Britain, vol. 48, No. 4, Apr. 1, 2006, pp. 430-439.

* cited by examiner

*Primary Examiner* — Carlos Ortiz Rodriguez
(74) *Attorney, Agent, or Firm* — Dority & Manning, P.A.

(57) ABSTRACT

A method for optimizing the location of heating elements within a mold for a rubber article. The position of one or more heating elements, e.g., curing pins or sipes, within the tread mold for a tire can be determined using a 3-D temperature profile so as to improve the efficiency of the curing process. For purposes of the optimization, the number of possible locations for such heating elements can be varied depending upon e.g., the computational time and accuracy desired.

20 Claims, 6 Drawing Sheets

HEATING ELEMENT LOCATION OPTIMIZATION

FIELD OF THE INVENTION

The present invention includes a method for optimizing the location of heating elements within a mold for a rubber article. More particularly, the present invention also relates to a method for optimizing the position of one or more heating elements, e.g., curing pins or sipes, within the tread of a tire to improve the efficiency of the curing process.

BACKGROUND OF THE INVENTION

Tires and other rubber based articles are vulcanized or cured through the application of heat to the article. For example, tire molds make use of an expandable bladder and steam to apply heat and pressure to an uncured tire to vulcanize the tire and add features to the tire such as various tread designs. The time, pressure, and temperature are carefully controlled in an effort to obtain the desired amount of curing, which can occur both during and after the molding process.

Control of the degree of curing is particularly challenging with a rubber article that has a non-uniform shape or composition. For example, large tires (e.g., truck, aircraft, farm, off-the road) frequently have multiple, large tread features of varying shape and the overall tire may have multiple layers of different rubber compositions. This variance in composition, structure, and geometry frequently complicates the tasks of determining the amount of time and temperature to achieve proper cure of the tire without unnecessarily over-curing certain parts of the tire or using more production time per tire than needed.

Improvements to the curing process have been achieved by adding heating elements (also referred to as "curing elements") to the mold based on the cure limiting parts of the rubber article. "Cure limiting" refers to the parts of the rubber article that are difficult to cure or take the longest to cure due to the article's heat transfer characteristics, composition, and/or geometry. For example, based on an identification of the cure limiting parts of the rubber article, WO 2007/037778 describes the addition of heating elements to a mold to enhance the transfer of heat into these cure-limiting zones and provide a more optimum cure.

The addition of heating elements to a mold provides certain challenges. One such challenge is the optimal positioning of the heating element and, more particularly, the optimal configuration of multiple heating elements. More specifically, it is desirable to optimize the number and configuration of heating elements in a mold so as to maximize heat transfer efficiency and reduce the overall duration of the curing time. Reductions in curing time can lead to a higher production rate and/or less energy consumption. With an objective of reducing the overall tire molding time and improving the degree of vulcanization in cure limiting parts of the tire such as the tread, a method of optimizing the location of a heating element within the tread would be useful.

Optimization can prove particularly difficult when the article to be cured is non-uniform as previously described. For example, the non-uniformities found in some tread patterns, particularly with large tires, presents unique problems in determining the heat transfer behavior during the transient conditions of the tire curing process. While heat transfer models can be developed for solution by finite element analysis, the computation time required to provide solutions for a non-uniform rubber article may not be practical—particularly when a configuration of multiple heating elements is being optimized. Moreover, the heat transfer characteristics will likely change with differences in tread patterns such as e.g., the shape and thickness of lugs or blocks in the tread—requiring a different analysis in each case. Therefore, an expedient method of optimizing the location of one or more heating elements within a tire or other rubber-based article of manufacture would be particularly useful.

THE SUMMARY OF THE INVENTION

Objects and advantages of the invention will be set forth in part in the following summary description, or may be obvious from the description, or may be learned through practice of the invention.

In one exemplary form, the present invention provides a method of optimizing the position of n heating elements within a mold for a rubber article. The steps include determining the net 3-D temperature profile of the single heating element; choosing the number of heating elements n; creating a number of heating element locations i as defined in two dimensions within the predetermined zone of the rubber article; calculating the minimum temperature obtained within the predetermined zone by the presence of a given configuration of n heating elements using the net 3-D temperature profile of the single heating element; repeating the calculating step for each of the different configuration of the n heating elements available among the i heating element locations; and identifying the specific configuration of n heating elements among locations i having the highest minimum temperature.

Additional steps or variations may be added to create still other forms of the invention. For example, the step of determining the net 3-D temperature profile of the single heating element may include determining a baseline 3-D temperature profile created within a predetermined zone of the rubber article by heating the article in the mold without heating elements and obtaining a heating element 3-D temperature profile created by heating the rubber article in the mold using a single heating element positioned within the predetermined zone of the rubber article. The step of calculating the minimum temperature for a given configuration may include finding the overall 3-D temperature increment profile within the predetermined zone by adding the net 3-D temperature profile of the single heating element to each heating element location i for the n heating elements; adding the overall 3-D temperature increment profile to the baseline 3-D temperature profile to determine the resulting 3-D temperature profile within the predetermined zone; and locating the minimum temperature in the resulting 3-D temperature profile. The step of determining the net 3-D temperature profile may include subtracting the baseline 3-D temperature profile from the heating element 3-D temperature profile.

The method may also include the step of selecting a new predetermined zone of the rubber article and then repeating the previously identified steps for the new predetermined zone. For example, a new predetermined zone might be selected when the highest minimum temperature identified results in a heating element location i that is near the boundary of the predetermined zone. The method may also include the step of repeating all steps in the method using a new number of heating elements n+1 and/or n−1. The method may also include the step of repeating all steps in the method using a new number of heating element locations i+1 and/or i−1.

Finite element analysis and/or temperature measuring devices may be used to determine the heating element 3-D temperature profile. For the step calculating the minimum temperature, the first configuration of n heating elements may be based partially upon determining the position within the predetermined zone having the greatest distance to either a heating element or the boundary of the predetermined zone (such as the surface of the mold) for a given configuration of n heating elements.

The heating elements can include a variety of forms such as e.g., a pin or a sipe.

The present invention can be used for manufacturing a variety of rubber articles including tires. For example, the predetermined zone may be a tread feature such as tread block. The present invention includes molds or tires manufactured according to the inventive methods described and claimed herein.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

The present invention relates to a method for optimizing the location of heating elements within a mold for a rubber article as well as advantageous molds and articles resulting from the use of such method. More particularly, the present invention also relates to a method for optimizing the position of one or more heating elements, e.g., curing pins, within the tread mold of a tire to improve the efficiency of the curing process. Reference will now be made in detail to exemplary processes and embodiments of the invention, one or more examples of which are illustrated in the figures. Each example is provided by way of explanation of the invention, and not meant as a limitation of the invention. For example, features illustrated or described as part of one exemplary process or embodiment can be used with another process or embodiment to yield still a third form of the invention. It is intended that the present invention include these and other modifications and variations. In addition, exemplary methods for use in tire molding will be used to explain the invention. However, using the teachings disclosed herein, one of skill in the art will understand that the present invention and claims that follow are not limited to use only with tires and may be used in the manufacture of other rubber-based articles as well.

As used herein, the terms below have the following definitions:

"3-D" references three-dimensions such as may be determined with reference to e.g., an x, y, z coordinate system.

"2-D" or "two-dimensional" references two dimensions as may be determined with reference to an x, y or r, θ coordinate system.

"Heating elements" or "curing elements" means any physical feature which may be added to the mold to project into features of the rubber article in order to improve the heat transfer efficiency. Examples include fins, sipes, pins, and others as may be described in WO 2007/037778. The discussion below uses pins for purposes of illustrating embodiments and methods according to the present invention. Using the teachings herein, one of skill in the art will understand that the present invention and claims are not limited to pins and other features may be used as heating elements as well. Additionally, it should be understood that "heating elements" or "curing elements" includes both passive elements (e.g., elements serving to transfer heat from another source) and active elements (e.g., elements that generate heat).

"n" refers to the number of heating elements, which may be any integer greater than or equal to one.

"i" refers to the number of heating element locations defined by two dimensions within a predetermined zone of the article to be heated.

A "configuration of n heating elements" refers to a specific positioning of n heating elements as defined by two dimensions within a predetermined zone of the article to be heated. The predetermined zone may be defined by a boundary. The boundary can be arbitrarily positioned at the point of contact with the mold, a smaller portion of the rubber article, or even used to define multiple subzones.

Figure 1:
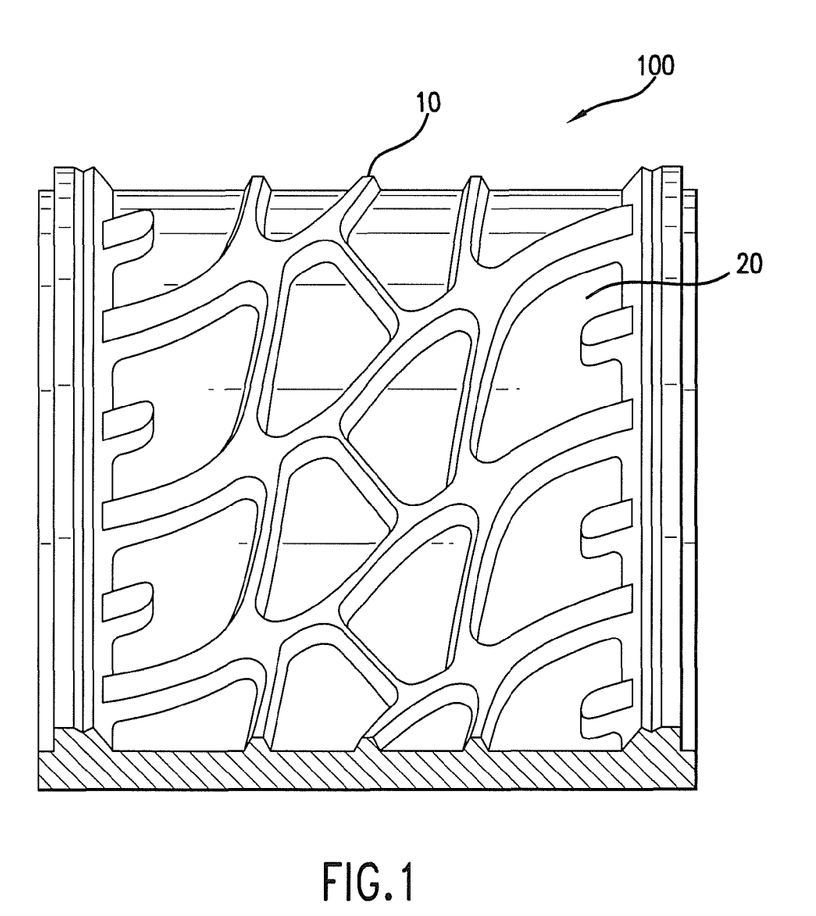
FIG. 1 illustrates a portion of a mold as may be used in curing a tire.
Figure 2:
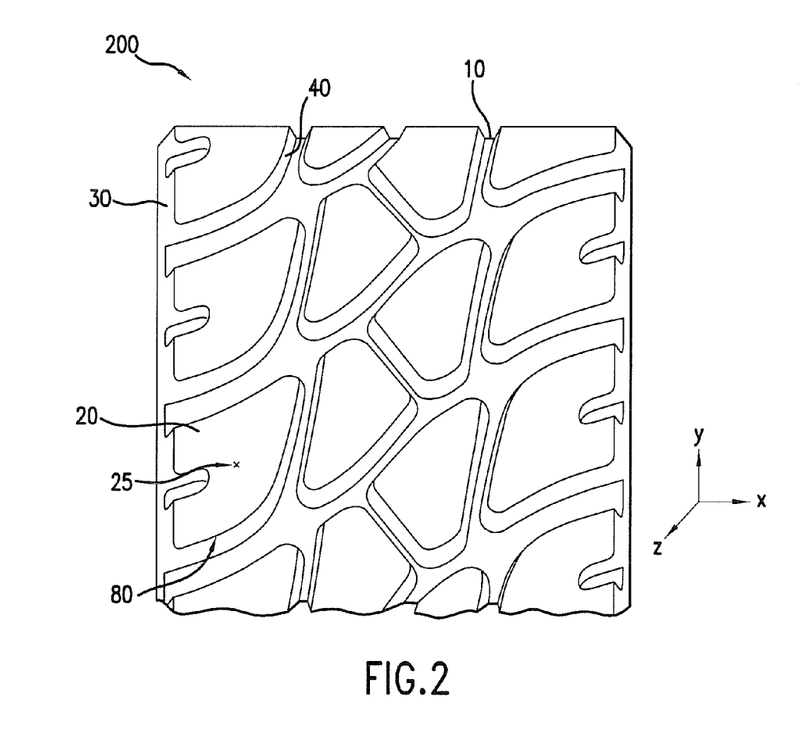
FIG. 2 illustrates a portion of a tire tread as could be created using the mold of FIG. 1.

FIG. 1 illustrates a portion of a mold 100 as may be used in curing a tire. Mold 100 produces the sculpture or pattern of the tread including large grooves 10 which provide tread blocks 20. Heat is applied to mold 100 to provide the energy needed for curing and, as known in the art, a bladder may be used to pressure the tire and its tread against mold 100. FIG. 2 illustrates a portion of the tread 200 that may be formed and cured using mold 100. The tread 200 includes groove 10 and blocks 20. For this particular tread example, the groove depth 40 is about 22 mm and the tread has a thickness 30 of about 25 mm. Depending upon the overall tire construction, during the molding process tread 200—and particularly blocks 20—may be cure limiting features of the tire as previously described. Accordingly, the addition of heating elements to the mold to improve heat transfer to blocks 20 is desirable.

Figure 3:
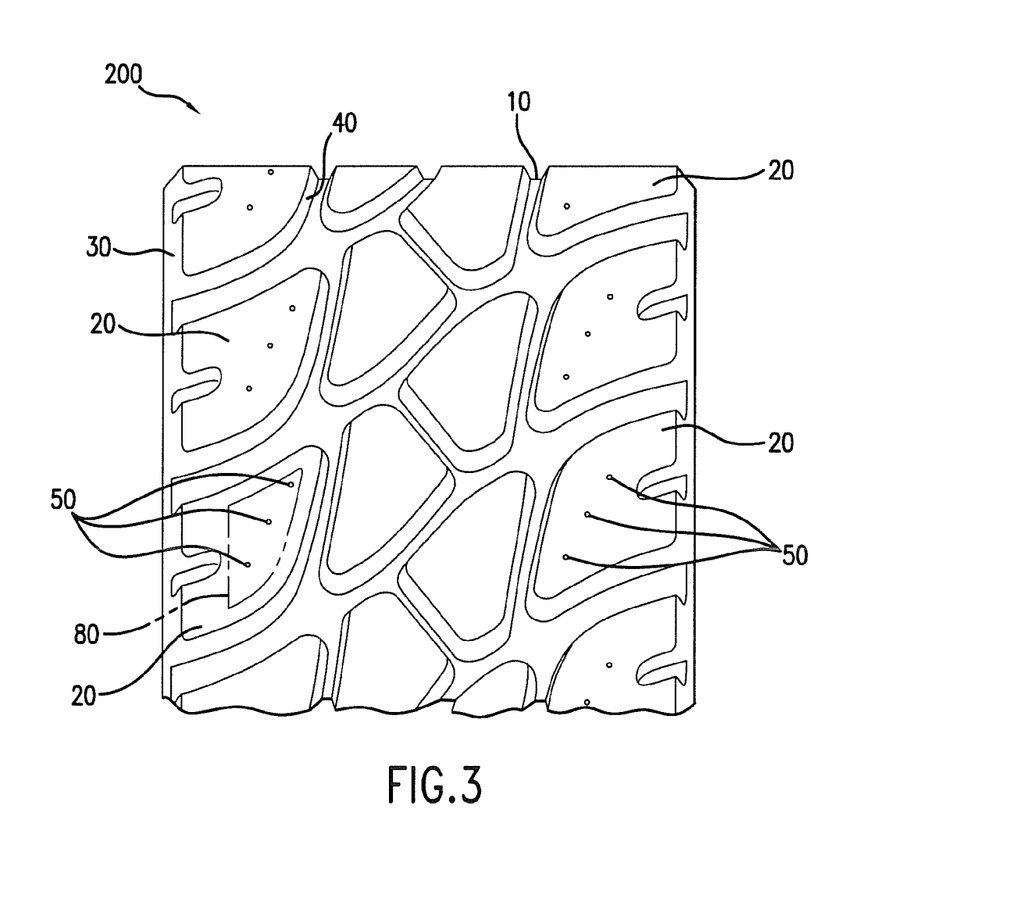
FIG. 3 illustrates a portion of the tire tread of FIG. 2 having pin holes formed in the tread blocks from pin-shaped heating elements.

FIG. 3 illustrates tread 200 with three pin holes 50 in blocks 20. Holes 50 were created by the addition of heating elements in the form of small pins to the surface of the blocks 20 in mold 100. The pins provide additional heat transfer to the cure limiting blocks 20. The pins can be added to both new and existing molds for both new tire manufacture and retreading operations as described, for example, in WO 2007/037778. For purposes of FIG. 3, the position of the holes 50 in blocks 20 is completely arbitrary and created solely for illustration. More desirable is a method of determining the number and position of the pins that create holes 50 so as to optimize the heat transfer characteristics of mold 100 and thereby increase the efficiency of the curing process.

Figure 4:
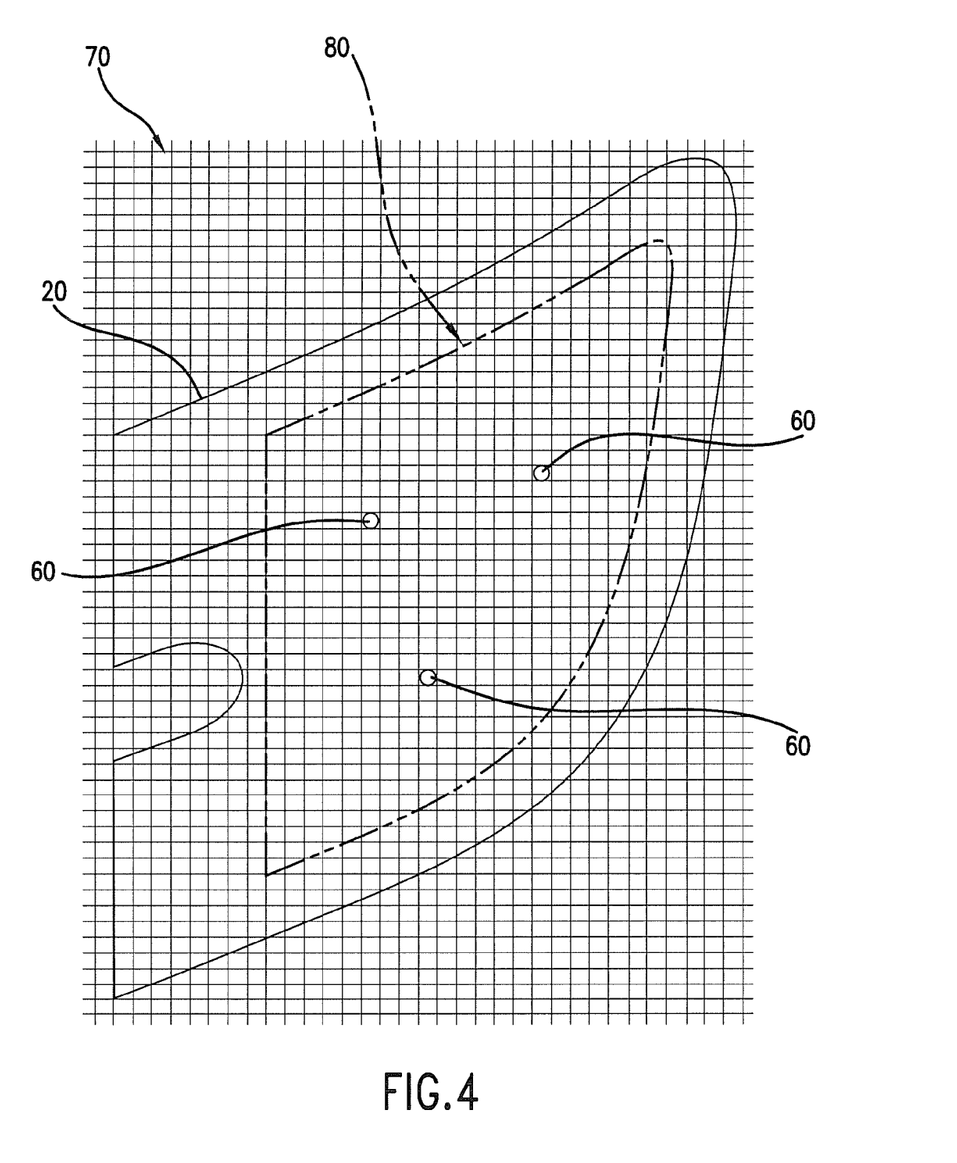
FIG. 4 is a schematic illustration of a plane from a tread block with a superimposed grid showing the location of three heating elements positioned by a two-dimensional method as referenced below.

FIG. 4 illustrates a block 20 of a mold where three pins 60 have been positioned based on a two-dimensional approach for determining the "cold" spot or most cure limiting spot in block 20. More particularly, FIG. 4 shows a block 20 onto which an arbitrarily arranged grid of cells 70 has been placed. Boundary 80 represents the arbitrary selection of a 2-D predetermined zone of block 20 within which heating elements or pins 60 may be positioned. For each possible 2-D configuration of the pins, each cell 70 within boundary 80 has a minimum distance, $\Delta_{dist}$, to the heat conducting metal of either a pin 60 or the metal of the mold along block 20. Among each of the cells within boundary 80, there is at least one cell representing a location that is positioned at the greatest such distance, $\Delta_{dist-max}$, from a heat source—i.e. a pin or the mold. Based on an assumption that this location is the "coldest" position for the given configuration and an assumption that a configuration which has the smallest $\Delta_{dist-max}$ will also have the smallest cure time, multiple 2-D configurations can be compared to determine the configuration that optimizes the cure time. While this approach is useful for determining pin locations 60, such method assumes e.g., that the heat transfer in block 20 and the underlying tire is two-dimensional. However, the actual heat transfer that will occur in mold 100 will not be limited to the two dimensions represented by the grid of cells 70. Additionally, each pin 60 will project into block 20 and is not limited to the planar representation of a grid as shown in FIG. 4. Yet, as previously stated, modeling the three dimensional (or 3-D) heat transfer behavior for the entire tire or its tread is not practical due to the extensive amount of computations required. Applicants have discovered an inventive method that incorporates the 3-D heat transfer effect in optimizing the position of the pins or other heating elements while reducing the amount of computational effort required for e.g., a finite element analysis of the entire tire or other rubber article.

Initially, a baseline 3-D temperature profile within a predetermined zone of the rubber article is created by determining the temperature profile that results from heating the rubber article in the mold without any heating elements. Because the cure is a transient process, a specific time during the cure is selected for obtaining the 3-D temperature profile. Returning to the exemplary tread 200 of FIG. 2, the predetermined zone is identified as all or part of block 20 based on block 20 being a cure limiting feature of the tire. For example, the predetermined zone as delineated by boundary 80 might include the entire block as shown in FIG. 2 or a smaller portion thereof as shown in FIG. 3. The 3-D transient temperature profile that results within block 20 during the cure of tread 200 is determined. Stated alternatively, the temperature as a function of position x, y, and z at time t within the predetermined zone is determined and can be referred to here as $T_{baseline}(x, y, z, t)$, where t is the selected moment in time during the curing process. Such may be accomplished, for example, by the use of finite element analysis in modeling the heat transfer behavior within block 20 while the tire is heated during the curing process. Alternatively, measuring probes could also be used to capture information about temperature profiles.

In addition to a baseline profile, a single heating element 3-D temperature profile is also obtained. This step requires determining the 3-D temperature profile that results from heating the rubber article in the mold using a single heating element positioned within a predetermined zone of the rubber article. A "snap shot" is taken at the same time during the curing process that was used for the 3-D baseline temperature profile. For example, as shown in FIGS. 2 and 3, the predetermined zone is defined as either all or some portion of the tread block 20. For purposes of illustration, boundary 80 is shown in FIG. 3 as selecting a portion of block 20 for the predetermined zone. For the selected moment in time during the curing process, the 3-D temperature profile is the temperature as a function of position x, y, and z within the predetermined zone of the tread block that occurs due to the presence of heating element. The heating element may be a pin located at the center 25 of the tread block 20. The resulting heating element 3-D temperature profile may be referred to as $T_{pin}(x, y, z, t)$. As with the baseline profile, the heating element 3-D temperature profile may be accomplished, for example, by the use of finite element analysis in modeling the heat transfer behavior within block 20 now heated by both the mold and a single pin in block 20.

Next, the net 3-D temperature profile of the single heating element is obtained. The net 3-D temperature profile is defined as the amount of temperature increment within the predetermined zone of the rubber article that is created by the presence of the single heating element. Returning to the example of tread block 20 in FIG. 2, the net 3-D temperature profile from the presence of a single pin located at the center 25 of the tread block 20 is determined by subtracting the baseline 3-D temperature profile from the 3-D temperature profile of the single pin. This can be represented mathematically as:

$$\Delta T_{pin}(x,y,z,t) = T_{pin}(x,y,z,t) - T_{baseline}(x,y,z,t) \qquad (1)$$

where $\Delta T_{pin}(x,y,z,t)$ = the net 3-D temperature profile of the single heating element The result of equation (1) provides the net 3-D temperature profile of a single pin located at the center 25 of the tread block. However, in order to use more than one pin, Applicants method allows determination of the optimal positioning of one or more heating elements within the article. For example, Applicants method allows a determination of the optimal locations of one or more heating pins in tread block 20.

Figure 5:
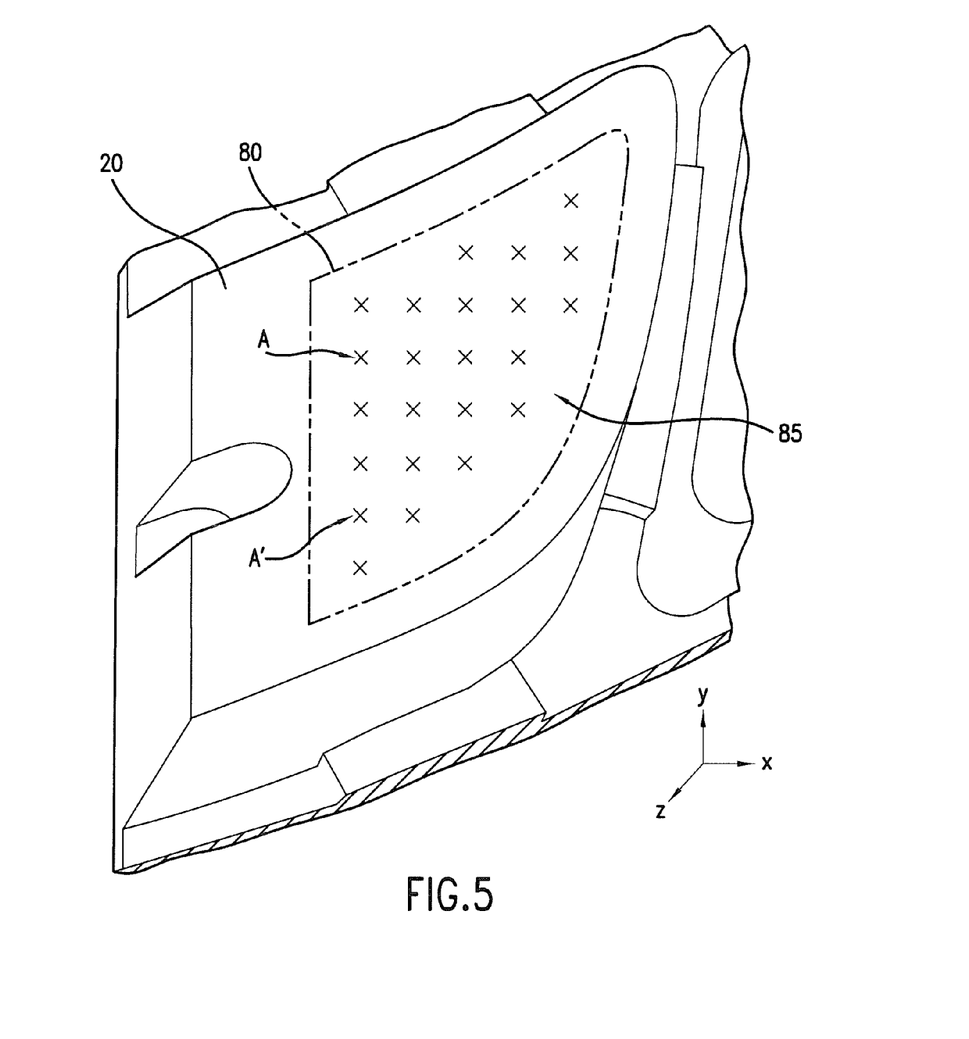
FIG. 5 illustrates a tread block with a superimposed grid representing twenty-three possible locations for the placement of heating elements within a predetermined zone. The illustrated grid by way of example only and other grid or coordinate systems could be readily used with the present invention. For example, a grid with non-orthogonal axes or even axes that conform to the shape of the tread block could be used.

Accordingly, within the predetermined zone used for the temperature profiles, an arbitrary number of possible heating element locations is defined in two dimensions. Turning to FIG. 5, each position 85 (marked with an x) represents a possible location for a heating pin among a total of "i" such locations 85 within the boundary 80 of block 20. Each location is defined in two-dimensions within the predetermined zone marked by boundary 80. For example, referring to FIG. 5, each possible location 85 can be identified by an x and y coordinate (an r, θ coordinate system could also be used). As part of the optimization process a larger (i+1) or small (i−1) number of possible locations can be defined with the total number being arbitrary depending upon the extent of optimization desired. In the example of FIG. 5, twenty-three such locations 85 are shown for purposes of illustration only.

The number of heating elements "n" to be optimized is also selected arbitrarily. For example, four pins may be selected for heating the predetermined zone of block 20. In the case of FIG. 5, the selection of four pins means each pin has a total of 20 possible locations once the locations of the three other pins are chosen, which results in 8,855 possible configurations of four pins among 23 locations 85. If only three pins are selected, then 1,771 configurations of three pins are possible among the 23 locations. The difference in curing efficiency between the four pin and three pin configurations can be compared to determine the optimal number of pins as well as the optimal locations.

Numerous other choices can be made in defining the predetermined zone and selecting the number of heating element locations i and the number of heating elements n. For example, the predetermined zone can be further divided into subzones where only one pin is located in each subzone. More specifically, the predetermined zone with boundary 85 for block 20 could be divided into four subzones—with each subzone having a number of possible heating element locations i for one of four pins. Assuming each of the subzone has twenty possible locations, the number of possible configurations is 160,000. However, by way of example, reducing just one of subzones to only nine possible heating element locations i would reduce the total number of possible configurations to 72,000 and thereby reduce the computation time required.

Once the number of heating elements locations had been defined in two dimensions within the predetermined zone of the rubber article, the minimum temperature resulting from each possible configuration of n heating elements is determined. More specifically, for each configuration of n heating elements within the predetermined zone, the minimum temperature that results in the predetermined zone from such configuration is determined. As part of the invention, Applicants determined that the positioning of the heating elements within the mold can be optimized by assuming that the net 3-D temperature profile of the single heating element, $\Delta T_{pin}$ (x, y, z, t), will move with the heating element as its location is moved in two dimensions among the heating element locations i within the predetermined zone.

For example, returning to FIG. 5, the effect of a single pin on block 20 during the curing process at time t can be determined by moving the net 3-D temperature profile, $\Delta T_{pin}$(x, y, z, t), mathematically from one location A to another location A'. This can be represented mathematically by the following steps:

First, define the nodal coordinates with respect to the center of the pin location at A:

$$x_{iA} = x_i - x_A; \quad y_{iA} = y_i - y_A; \quad z_{iA} = z_i - z_A \qquad (2)$$

where ($x_i$, $y_i$, $z_i$) are the coordinates of node i and ($x_A$, $y_A$, $z_A$) are the coordinates of the center of location A in the predetermined zone of block 20.

Second, define the nodal coordinates with respect to the center of the pin location A':

$$x_{i'A'} = x_{i'} - x_{A'}; \quad y_{i'A'} = y_{i'} - y_{A'}; \quad z_{i'A'} = z_{i'} - z_{A'} \qquad (3)$$

where ($x_{i'}$, $y_{i'}$, $z_{i'}$) is the coordinates of node i' and ($x_{A'}$, $y_{A'}$, $z_{A'}$) is the coordinates of the center of location A' on the surface.

Third, translate the temperature field from position A to A' by assigning each nodal temperature in coordinate A to the corresponding one in new coordinate A'. For example, for any node i' in the coordinate A', the corresponding node i in the coordinate A has a minimum value of:

$$(|x_{i'A'} - x_{iA}| + |y_{i'A'} - y_{iA}| + |z_{i'A'} - z_{iA}|), \qquad (4)$$

where i varies from 1 to the number of all nodes, and each term or addend is the absolute value of the difference between A' and A for the x, y, or z coordinate.

Other criteria may be used. For example, instead of the absolute value the square values could also be used.

Applicants compared this approach with determining the effect of moving a pin from A to A' using finite element analysis. It was determined that the above approach gives about the same result with respect to the area affected by the pin and the magnitude of the temperature resulting from the movement. Thus, the above approach provides a method to move the net 3-D temperature profile, $\Delta T_{pin}$(x, y, z, t), mathematically within the predetermined zone without using finite element analysis for each movement.

In addition, Applicants also determined that for purposes of optimization, the overall 3-D temperature increment profile within the predetermined zone can be determined by mathematically adding the net 3-D temperature profile of the single heating element, $\Delta T_{pin}$(x, y, z, t), to each heating element location i for the n heating elements. In other words, the overall temperature increment occurring in three-dimensions throughout tread block 20 by the addition of n pins within boundary 85 can be calculated by mathematically superimposing the net increment caused by one pin in three dimensions onto each pin location i for a given configuration of n pins. This overall 3-D temperature increment profile can then be added to the baseline temperature profile, $T_{baseline}$(x, y, z, t), to determine the resulting 3-D temperature profile within the predetermined zone caused by the addition of a given configuration n pins among the i possible locations. This can be represented mathematically as follows:

$$T_{resulting} = T_{baseline}(x,y,z,t) + \Delta T_{pin\ 1}(x,y,z,t) + \Delta T_{pin\ 2}(x,y,z,t) + \ldots + \Delta T_{pin\ n}(x,y,z,t) \qquad (5)$$

Because an intensive computational analysis such as finite analysis is not used to make this mathematical addition, an extensive savings in computational effort is achieved.

The resulting 3-D temperature profile, $T_{resulting}$, is calculated for each possible configuration on n pins within the predetermined zone as set forth above. Each resulting 3-D profile has at least one minimum temperature for that particular configuration of heating elements somewhere within the 3-D profile for the predetermined zone. Stated alternatively and with reference to FIG. 5, the resulting temperature profile in three dimensions within the boundary 80 of block 20 is calculated for each possible configuration of n pins among the i possible locations 85 in the predetermined zone. For each configuration, there will be a minimum temperature somewhere within the resulting temperature profile for block 20. By selecting the configuration of pins that corresponds to the highest minimum temperature in the resulting temperature profile, the optimum configuration of n pins is identified.

A variety of additional steps can be taken to further improve the optimization of heating element locations using the methods described herein. For example, the exemplary methods described above can be repeated using a different number n of heating elements, a different number of possible locations i for the heating elements, different predetermined zones (i.e. different boundaries), subdividing into subzones, and or choosing different times t in the curing process. In addition, if the optimized configuration results in a heating element being located close to the boundary of a predetermined zone, depending upon the physical features of the article, the boundary may be shifted or the predetermined zone expanded to determine whether additional optimization would result in a new configuration.

Figure 6:
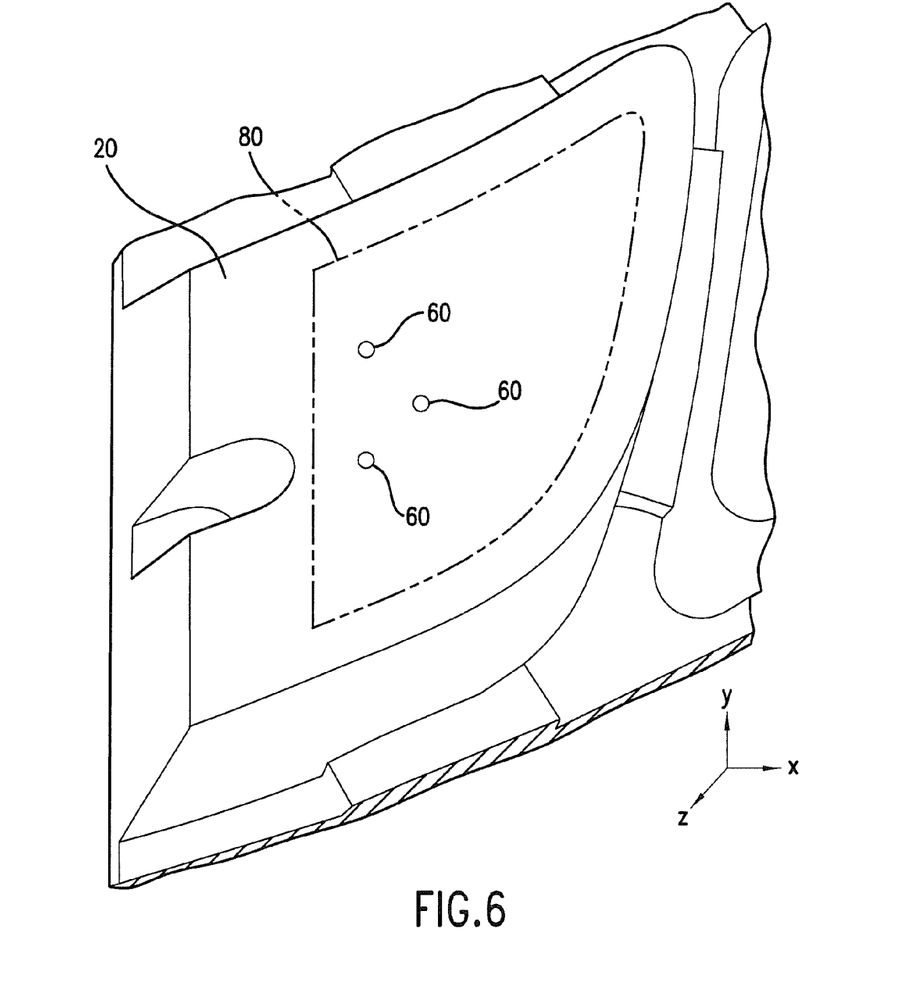
FIG. 6 illustrates a tread block with a three pin heating elements that have been located using an exemplary method according to the present invention.

By optimizing the location and/or number of pins, efficiencies in the curing process can be realized. For example, as previously described, FIG. 4 represents the location of three pins within block 20 as determined using only a two-dimensional approach where the distance between pins and the boundary 80 is minimized. FIG. 6 shows the same tread block where the location of three pins was optimized using the above described methods with a three-dimensional temperature profile. As will be apparent from a comparison of the figures, the configuration of the three pins changed dramatically using Applicants' inventive method. In addition, Applicants were also able to predict a reduction in the overall curing time required by using the optimized pin configuration. Such a reduction can lead to substantially less mold cycle time per tire and a corresponding overall improved production rate.

Finally, using four-pin configurations, Table 1 below represents the results of a comparison between the 2-D optimized approach described above and an approach using methods of the present invention (referred to in Table 1 as 3-D optimized). More specifically, the location of pins was determined using a 2-D optimized approach and a 3-D optimized approach for a tread pattern similar to block 20. Using these optimized pin configurations, finite element analysis was used to solve a 3-D transient heat transfer model. The finite element model was previously correlated with temperature studies on actual tires performed using thermocouples inserted into the tread. Resulting cure times appear in Table 1.

TABLE I

Four Pins

|  | Curing Time (min) | Pin Efficiency |
|---|---|---|
| No pins | 49.4 | — |
| 2-D Optimized | 43 | 1.6'/pin |
| 3-D Optimized | 42 | 1.85'/pin |

Pin efficiency is used herein as the savings in curing time divided by the number of pins used. As such, the methods of the present invention lead to a substantial reduction in the curing time per tire while also increasing the efficiency of each pin. Such a reduction in curing time can lead to a substantial savings in overall production time particularly when considered for a large volume of tires.

It should be understood that the present invention includes various other modifications that can be made to the exemplary embodiments described herein that come within the scope of the appended claims and their equivalents. These and other embodiments of the present invention are with the spirit and scope of the claims that now follow.

What is claimed is:

1. A method of optimizing the position of one or more heating elements within a mold for a rubber article, the steps comprising:
   determining a net 3-D temperature profile of a single heating element;
   choosing a number of heating elements n, wherein n is an integer greater than, or equal to, one;
   creating a number of heating element locations i as defined in two dimensions within a predetermined zone of the rubber article, wherein i is an integer greater than, or equal to, one;
   calculating a minimum temperature obtained within the predetermined zone by the presence of a given configuration of n heating elements using the net 3-D temperature profile of the single heating element from said step of determining the net 3-D temperature profile;
   repeating said step of calculating the minimum temperature for each configuration of the n heating elements available among the i heating element locations; and
   identifying a specific configuration of n heating elements among the i heating element locations that has a highest minimum temperature.

2. A method of optimizing as in claim 1, wherein said step of determining the net 3-D temperature profile of the single heating element further comprises the steps of:
   determining a baseline 3-D temperature profile created within a predetermined zone of the rubber article by heating the article in the mold without heating elements; and
   obtaining a heating element 3-D temperature profile created by heating the rubber article in the mold using a single heating element positioned within the predetermined zone of the rubber article.

3. A method of optimizing as in claim 2, where said step of determining the net 3-D temperature profile comprises subtracting the baseline 3-D temperature profile from the heating element 3-D temperature profile.

4. A method of optimizing as in claim 2, wherein said obtaining step comprises using finite element analysis to determine the heating element 3-D temperature profile.

5. A method of optimizing as in claim 2, wherein said obtaining step comprises using temperature measuring devices to determine the heating element 3-D temperature profile.

6. A method of optimizing as in claim 1, wherein said step of calculating the minimum temperature for a given configuration further comprises the steps of:
   finding an overall 3-D temperature increment profile within the predetermined zone by adding the net 3-D temperature profile of the single heating element to each heating element location i for the n heating elements;
   adding the overall 3-D temperature increment profile to the baseline 3-D temperature profile to determine the resulting 3-D temperature profile within the predetermined zone; and
   locating the minimum temperature in the resulting 3-D temperature profile.

7. A method of optimizing as in claim 1, further comprising the step of selecting a new predetermined zone of the rubber article and repeating the steps of claim 1 for the new predetermined zone.

8. A method of optimizing as in claim 7, wherein the predetermined zone is defined by a boundary, and wherein said step of selecting a new predetermined zone is undertaken when the highest minimum temperature identified results in a heating element location i that is near the boundary of the predetermined zone.

9. A method of optimizing as in claim 1, further comprising the step of repeating the steps of claim 1 for a new number of heating elements, n+1.

10. A method of optimizing as in claim 1, further comprising the step of repeating the steps of claim 1 for a new number of heating elements, n−1, wherein n is an integer greater than, or equal to, two.

11. A method of optimizing as in claim 1, further comprising the step of repeating the steps of claim 1 for a new number of heating element locations, i+1.

12. A method of optimizing as in claim 1, further comprising the step of repeating the steps of claim 1 for a new number of heating element locations, i−1, wherein i is an integer greater than, or equal to, two.

13. A method of optimizing as in claim 1, wherein the heating element is a pin or a sipe.

14. A method of optimizing as in claim 1, wherein the rubber article is a tire and the predetermined zone is determined based upon a tread feature.

15. A method of optimizing as in claim 14, wherein the predetermined zone is positioned within a tread block of the tire.

16. A method of optimizing as in claim 15, wherein the predetermined zone is defined by a boundary, and wherein the first configuration of n heating elements used for said step of calculating the minimum temperature is based in part upon determining the location within the tread block having the greatest distance to either a heating element or the boundary for a given configuration of heating elements.

17. A method of optimizing as in claim 1, wherein the predetermined zone is defined by a boundary, and wherein the first configuration of n heating elements used for said step of calculating the minimum temperature is based in part upon determining the location within the predetermined zone having the greatest distance to either a heating element or the boundary for a given configuration of heating elements.

18. A method of optimizing as in claim 1, wherein said step of creating a number of heating element locations i along two dimensions within the predetermined zone of the rubber article further comprises applying a grid to the predetermined zone.

19. A mold for a rubber article having n heating elements positioned within the mold as determined by the method of claim 1 or 2.

20. A tire manufactured with a mold optimized according to the method of claim 1 or 2.

* * * * *